United States Patent
Lee et al.

(10) Patent No.: US 9,083,755 B2
(45) Date of Patent: Jul. 14, 2015

(54) SYSTEM AND METHOD FOR MANAGING AND APPLING HISTORY INFORMATION OF TERMINAL IN CONVERGED PERSONAL NETWORK SERVICE ENVIRONMENT, AND CONVERGED PERSONAL NETWORK SERVICE SERVER, MOBILE COMMUNICATION AND END DEVICE THEREFOR

(75) Inventors: Jeong Hoon Lee, Seoul (KR); Jeong Min You, Seoul (KR); In Hwan Kim, Seoul (KR)

(73) Assignee: SK PLANET CO., LTD., Seoul (KR)

( * ) Notice: Subject to any disclaimer, the term of this patent is extended or adjusted under 35 U.S.C. 154(b) by 612 days.

(21) Appl. No.: 12/812,380

(22) PCT Filed: Dec. 4, 2008

(86) PCT No.: PCT/KR2008/007156
§ 371 (c)(1),
(2), (4) Date: Jul. 9, 2010

(87) PCT Pub. No.: WO2010/050643
PCT Pub. Date: May 6, 2010

(65) Prior Publication Data
US 2010/0284390 A1 Nov. 11, 2010

(30) Foreign Application Priority Data
Oct. 31, 2008 (KR) .................. 10-2008-0107991

(51) Int. Cl.
*H04W 4/00* (2009.01)
*H04B 7/15* (2006.01)
(Continued)

(52) U.S. Cl.
CPC ............ *H04L 67/22* (2013.01); *H04L 12/14* (2013.01); *H04L 12/1485* (2013.01);
(Continued)

(58) Field of Classification Search
CPC ..... H04L 12/14; H04L 12/1485; H04L 12/16; H04L 41/50; H04L 41/5041; H04L 67/04; H04L 67/22; H04L 67/303; H04W 4/203; H04W 4/24; H04W 8/02; H04W 8/22; H04W 40/24; H04W 80/00; H04W 80/12; H04W 84/02; H04W 84/12
See application file for complete search history.

(56) References Cited

U.S. PATENT DOCUMENTS
7,283,813 B2 10/2007 Hamanaga et al.
(Continued)

FOREIGN PATENT DOCUMENTS
KR 10-2008-0087412 1/2008
KR 1020080024712 3/2008
WO 2010/047470 4/2010

OTHER PUBLICATIONS
International Search Report mailed Jun. 22, 2009 for PCT/KR2008/007156.
(Continued)

*Primary Examiner* — Alpus H Hsu
(74) *Attorney, Agent, or Firm* — Lowe Hauptman & Ham LLP

(57) ABSTRACT

Disclosed herein is a system for managing and using history information of terminals in a Converged Personal Network Service (CPNS) environment. The system includes a CPNS server for collecting and storing access information and history information of mobile communication terminals and end devices which transmit and receive information over a wireless local area network, and, if the previously stored history information is requested while a CPNS service is active between a mobile communication terminal and an end device, extracting the corresponding information, and providing the extracted information to the mobile communication terminal and the end device, the mobile communication terminals each for, while using the CPNS service, performing a CPNS service-related procedure using the history information received from the CPNS server, and the end devices each for, while using the CPNS service, performing a CPNS service-related procedure using the history information received via the mobile communication terminal.

17 Claims, 5 Drawing Sheets

(51) Int. Cl.
  *H04M 3/42*      (2006.01)
  *H04L 29/08*      (2006.01)
  *H04L 12/14*      (2006.01)
  *H04W 8/22*      (2009.01)
  *H04W 4/20*      (2009.01)
  *H04W 84/12*      (2009.01)

(52) U.S. Cl.
  CPC ............ *H04L 67/303* (2013.01); *H04W 4/203* (2013.01); *H04W 8/22* (2013.01); *H04L 67/04* (2013.01); *H04W 84/12* (2013.01)

(56) References Cited

U.S. PATENT DOCUMENTS

| | | | |
|---|---|---|---|
| 7,565,421 B2* | 7/2009 | Naruse ........................... | 709/223 |
| 7,986,686 B2* | 7/2011 | Nadeau et al. ................ | 370/386 |
| 2005/0053220 A1* | 3/2005 | Helbling et al. ......... | 379/211.02 |
| 2005/0059416 A1* | 3/2005 | Ono ............................... | 455/457 |
| 2005/0084087 A1* | 4/2005 | Rajagopalan et al. ... | 379/205.01 |
| 2006/0205383 A1* | 9/2006 | Rollender ................... | 455/404.1 |
| 2007/0143448 A1 | 6/2007 | Yi | |
| 2008/0139112 A1* | 6/2008 | Sampath et al. ............. | 455/3.04 |
| 2008/0160957 A1* | 7/2008 | Ono ............................... | 455/408 |
| 2009/0113525 A1* | 4/2009 | Rajan et al. ....................... | 726/4 |
| 2009/0144807 A1* | 6/2009 | Zheng ............................... | 726/3 |
| 2009/0233586 A1* | 9/2009 | Jahr .......................... | 455/414.1 |
| 2010/0063969 A1* | 3/2010 | Kasargod et al. ............. | 707/740 |

OTHER PUBLICATIONS

CPNS Use Case—Mobile Phone to App. Device; slide #1-#6; 2008 open Mobile Alliance Ltd. ; SK Telecom, Altgen; Apr. 17, 2008.
Office action from JPO mailed Aug. 14, 2012 for JP 2011-534363.
Office action from KPO mailed Aug. 27, 2012 for KR 10-2008-0107991.

* cited by examiner

| Mobile ID | End Device ID | Service Provided | Charging | Capability | ...... |
|---|---|---|---|---|---|
| Mobile communication terminal 1 | Game player 1 | Game #2, #5, .... | $10 | LCD, Codec... | ........ |
| | PMP 1 | Movie #3, Music #7 | $17 | LCD, Codec... | ........ |
| | ,........ | ,........ | | | ........ |
| Mobile communication terminal 2 | Game player 1 | Game #1, #5, .... | $14 | LCD, Codec... | ........ |
| | PMP 1 | Movie #2, Music #6 | $20 | LCD, Codec... | ........ |
| | ,... .... | ... .... | | | ........ |

FIG. 3

| End Device ID | Mobile ID | Service Provided | Charging | Information | ...... |
|---|---|---|---|---|---|
| Game player 1 | Mobile communication terminal 1 | Game #2, #5, .... | $10 | Rate system, Transfer rate... | ...... |
| | Mobile communication terminal 2 | Movie #1, #5 | $14 | Rate system, Transfer rate... | ...... |
| | ,....... | ... ... | ... ... | ... ... | ...... |
| PMP 1 | Mobile communication terminal 1 | Movic #3, Music #7 | $17 | Rate system, Transfer rate... | ...... |
| | Mobile communication terminal 2 | Movie #2, Music #6 | $20 | Rate system, Transfer rate... | ...... |
| | Mobile communication terminal 3 | Movic #5, ... | ... ... | ... ... | ...... |
| | , ... .... | , ... .... | , ... ... | , ... ... | , ... ... |

SYSTEM AND METHOD FOR MANAGING AND APPLING HISTORY INFORMATION OF TERMINAL IN CONVERGED PERSONAL NETWORK SERVICE ENVIRONMENT, AND CONVERGED PERSONAL NETWORK SERVICE SERVER, MOBILE COMMUNICATION AND END DEVICE THEREFOR

CROSS REFERENCE TO RELATED APPLICATION

This application claims the priority of Korean Patent Application No. 10-2008-0107991, filed on Oct. 31, 2008 in the KIPO (Korean Intellectual Property Office), the disclosure of which is incorporated herein in their entirety by reference. Further, this application is the National Phase application of International Application No. PCT/KR2008/007156, filed Dec. 4, 2008, which designates the United States and was published in English. Each of these applications is hereby incorporated by reference in their entirety into the present application.

TECHNICAL FIELD

The present invention relates, in general, to a system and method for managing and using the history information of terminals in a Converged Personal Network Service (CPNS) environment, and a CPNS server, a mobile communication terminal and an end device therefore, and, more particularly, to a system and method for managing and using the history information of terminals in a CPNS environment, which is capable of managing the history information of a mobile communication terminal and an end device and using it when a CPNS is used, and to a CPNS server, a mobile communication terminal, and an end device therefor.

BACKGROUND ART

With the development of information and communication technology, a variety of end terminals capable of playing back documents, images, motion pictures, etc., such as MPEG Audio Layer 3 (MP3) players, Personal Multimedia Players (PMPs), and Ultra-Mobile Personal Computers (UMPCs), have been used.

The end terminals enable users to download desired content from Personal Computers (PCs) and play the downloaded content. However, the end terminals have a problem in that users cannot download desired content onto the end terminals when they are moving or the end terminals cannot be connected with a PC.

In order to overcome this problem, there was proposed a technology for adding communication means capable of accessing wireless local area networks, such as a Bluetooth network and an UltraWideBand (UWB) network, to the end terminals.

According to the technology, it is possible to download content from external devices over wireless local area networks. Although this method enables content, stored in external devices, to be downloaded, it is problematic in that content that is desired by a user but is not stored in an external device cannot be downloaded.

Furthermore, although wireless local area communication is used, mobile communication terminals cannot directly receive content or services which have been previously provided by service providers or cellular communication providers via existing cellular communication.

DISCLOSURE

Technical Problem

Accordingly, the present invention has been made keeping in mind the above problems occurring in the prior art, and an object of the present invention is to propose a CPNS technology for providing an end device, such as a PMP, with a desired service in such a manner as to connect the end device to a mobile communication terminal via wireless local area communication and then access an existing content service provider using the cellular communication function of the mobile communication terminal.

Meanwhile, in order for an end device to perform wireless local area communication with a mobile communication terminal and receive a data service in a CPNS environment, the end device must undergo an initial setting procedure, including ID format checking and authentication. There are cases where this procedure must be performed even though a mobile communication terminal and an end terminal have been connected to each other several times before.

Another object of the present invention is to provide a system and method for managing and using the history information of terminals in a CPNS environment, which is capable of systematically managing related information, including access information, which is generated when a mobile communication terminal and an end device are connected over a wireless local area communication network and a CPNS is provided in a CPNS environment, and simplifying the CPNS-related procedure that must be performed later so that a CPNS may be provided, and a CPNS server therefor.

A further object of the present invention is to provide a mobile communication terminal and an end device which are capable of performing a CPNS-related procedure more conveniently using history information including access information and service information concerning the connection between the mobile communication terminal and the end device.

Technical Solution

In order to accomplish the above objects, the present invention provides a system for managing and using history information of terminals in a Converged Personal Network Service (CPNS) environment, the system including a CPNS server for collecting and storing access information and history information of mobile communication terminals and end devices which transmit and receive information over a wireless local area network, and, if the previously stored history information is requested while a CPNS is active between a mobile communication terminal and an end device, extracting the corresponding information, and providing the extracted information to the mobile communication terminal and the end device; the mobile communication terminals each for, while using the CPNS, performing a CPNS-related procedure using the history information received from the CPNS server; and the end devices each for, while using the CPNS, performing a CPNS-related procedure using the history information received via the mobile communication terminal.

Preferably, the history information of each of the mobile communication terminals includes at least one of an ID of the mobile communication terminal, a ID of at least one connected end device, at least one provided service, charge information, capability information of the end device and a combination thereof.

Preferably, if the history information concerning the connection between the mobile communication terminal and the end device has been registered, the mobile communication terminal requests content using the previously stored capability information of the end device, continues to receive a service that has been provided to the end device before, or skips a charge-related setup procedure.

Preferably, if the history information is history information of the end device, the history information includes at least one of an ID of the end device, an ID of at least one connected mobile communication terminal, at least one provided service, charge information, service-related information and a combination thereof, and the service-related information includes at least one of a rate system, a transfer rate and a combination thereof.

Preferably, if the history information concerning the connection between the mobile communication terminal and the end device has been registered, the end device requests a service based on the previously stored rate system and transfer rate, continues to receive a service that has been provided before, skips a charge-related setup procedure, or performs setting so that charges are imposed on the mobile communication terminal that is selected by the end device from mobile communication terminals to which the end device had been connected before.

Additionally, the present invention provides a CPNS server, including a communication interface unit for performing communication over a mobile communication network; a history registration and management unit for collecting and storing access information and history information of mobile communication terminals and end devices which transmit and receive information over a wireless local area network; a history information provision unit for, if previously stored history information is requested while a CPNS is provided between a mobile communication terminal and an end device, extracting the requested history information and providing the extracted history information to the mobile communication terminal and the end device; a content request and provision unit for, when a request for content is received from a mobile communication terminal, requesting the content from a corresponding server that provides the content, receiving the requested content from the server, and providing the received content to the mobile communication terminal; a charge processing unit for imposing charges for use of the CPNS; and a database for storing the history information of the mobile communication terminals and end devices and CPNS server-related information.

Preferably, the CPNS server further includes a mobile communication terminal information management unit for registering in the database the information of the mobile communication terminals which perform communication with end devices over a wireless local area network and managing the information.

Preferably, the CPNS server further includes an end device information management unit for registering in the database the information of the end devices which perform communication with the mobile communication terminals over a wireless local area network and managing the information.

Additionally, the present invention provides a mobile communication terminal connected to a CPNS server via a mobile communication network, connected to at least one end device via wireless local area communication, and configured to refer to history information when using a CPNS, the mobile communication terminal including a wireless communication unit for performing wireless communication with a wireless local area network or the mobile communication network; a connection notification unit for transmitting IDs and authentication information of the end device and the mobile communication terminal to the CPNS server; a service processing unit for requesting CPNS-related information from the CPNS server with reference to the history information received from the CPNS server; a history information reception and provision unit for receiving history information, which matches a request of the mobile communication terminal, from the CPNS server, and displaying the received history information on a screen; and a charge information provision unit for transmitting charge information of the mobile communication terminal or the end device to the CPNS server.

Additionally, the present invention provides an end device connected to at least one mobile communication terminal over a wireless local area network and configured to receive a CPNS with reference to history information, the end device including a communication interface unit for performing communication over the wireless local area network; a service request unit for requesting a CPNS from a CPNS server through the mobile communication terminal using history information received from the CPNS server; a history information reception and provision unit for, when history information received through the mobile communication terminal from the CPNS server is received, displaying the history information on a screen; and a charge information provision unit for transmitting charge information based on use of the CPNS to the mobile communication terminal.

Additionally, the present invention provides a method of managing and using history information of terminals in a CPNS environment for a system including a CPNS server, at least one mobile communication terminal and at least one end device, the method including the steps of a) when the mobile communication terminal and the end device are connected, the CPNS server collecting and storing access information and history information of the mobile communication terminal and the end device which transmit and receive information over a wireless local area network; b) if a request received from the mobile communication terminal is related to history information, the CPNS server extracting history information of the mobile communication terminal and the end device and providing the extracted history information to the mobile communication terminal and the end device; and c) while using a CPNS, the mobile communication terminal and the end device performing a CPNS-related procedure based on the history information received from the CPNS server.

Preferably, when the history information is history information of the mobile communication terminal, the history information includes at least one of an ID of the mobile communication terminal, an ID of the connected end device, at least one provided service, charge information, capability information of the end device and a combination thereof, and, at step c), the mobile communication terminal requests corresponding content based on the previously stored capability information of the end device, continues to receive a service that has been provided before or skips a charge-related setup procedure.

Preferably, when the history information is history information of the end device, the history information includes at least one of an ID of the end device, an ID of the connected mobile communication terminal, at least one provided service, charge information, service-related information and a combination thereof, the service-related information including at least one of a rate system, a transfer rate and a combination thereof, and, at step c), the end device requests a service based on the previously stored rate system and transfer rate, continues to receive a service that has been provided before, skips a charge-related setup procedure, or performs setting so that charges are imposed on the mobile communication terminal which is selected by the end device from among mobile communication terminals to which the end device had been connected before.

Additionally, the present invention provides a method of managing and using history information of terminals in a CPNS environment for a CPNS server, the method including the steps of a) when a mobile communication terminal and an end device are connected, the CPNS server collecting and storing access information and history information of the mobile communication terminal and the end device which transmit and receive information over a wireless local area network; and b) if a specific request received from a mobile communication terminal is related to history information, the CPNS server extracting the history information of the mobile communication terminal and the end device and providing the extracted history information to the mobile communication terminal and the end device.

Additionally, the present invention provides a method of using history information of terminals in a CPNS environment for a mobile communication terminal connected to a CPNS server via a mobile communication network and connected to an end device via a wireless local area network, the method including the steps of a) when the mobile communication terminal is connected to the end device over the wireless local area network, the mobile communication terminal informing the CPNS server of this connection; b) when a specific service is requested of the CPNS server, the mobile communication terminal receiving specific service-related history information from the CPNS server; and c) while using a CPNS, the mobile communication terminal performing a CPNS-related procedure based on the history information received from the CPNS server.

Additionally, the present invention provides a method of using history information of terminals in a CPNS environment for an end device connected to a mobile communication terminal via a wireless local area network, the method including the steps of a) the end device requesting a specific service from a CPNS server through the mobile communication terminal via wireless local area communication; b) the end device receiving specific service-related history information from the CPNS server through the mobile communication terminal; and c) while using a CPNS, the end device performing a CPNS-related procedure based on the history information.

Advantageous Effects

As described above, the system and method for managing and using the history information of terminals in a CPNS environment and the CPNS server therefor according to the present invention systematically manage related information, including access information, which is generated when a mobile communication terminal and an end device are connected over a wireless local area network and a CPNS is provided in a CPNS environment, and provides the related information to the mobile communication terminal and the end device, so that the effect of simplifying the procedure that must be performed later in order to receive a CPNS can be expected.

Furthermore, the mobile communication terminal and end device of the present invention have an advantage in that they can perform a CPNS request procedure more conveniently using access information and history information, including service information, concerning the connection between the mobile communication terminal and the end device.

DESCRIPTION OF DRAWINGS

FIG. 3 is a diagram showing an example of the history information table of an end device according to the present invention;

DESCRIPTION OF REFERENCE NUMERALS OF PRINCIPAL ELEMENTS IN THE DRAWINGS

Figures 1, 2:
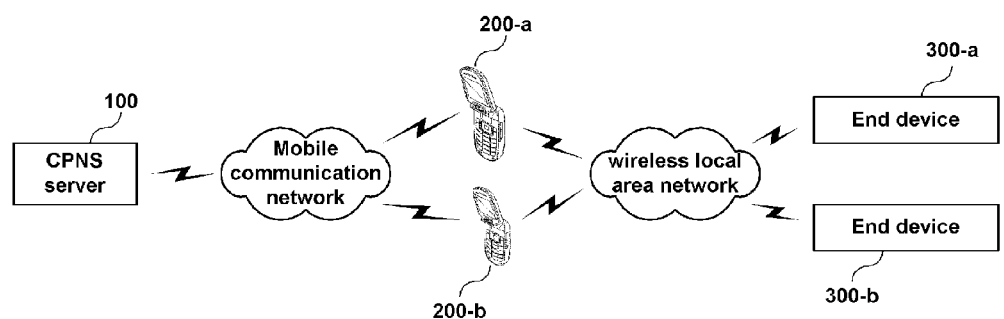
FIG. 1 is a diagram showing the connective relationship between the system of the present invention and a communication network.
FIG. 2 is a diagram showing an example of the history information table of a mobile communication terminal according to the present invention.

100: CPNS server
110, 310: communication interface unit
120: mobile communication terminal information management unit
130: end device information management unit
140: history registration and management unit
150: history information provision unit
160: content request and provision unit
170: charge processing unit
180: database 200: mobile communication terminal
210: wireless communication unit 220, 320: input unit
230: output unit 240, 340: storage unit
250: connection notification unit
260: service processing unit
270: history information reception and provision unit
280: charge information provision unit
300: end device 330: playback unit
350: service request unit
360: history information reception and provision unit
370: charge information provision unit

MODE FOR INVENTION

The 'CPNS (Converged Personal Network Service) environment' disclosed in the present invention is a network environment to enable portable terminal, which can perform only local area communication but cannot perform cellular communication with a mobile communication network, to perform local area communication with a mobile communication terminal functioning as a Personal Network (PN) Service gateway and use a data service that can be provided via cellular communication.

The 'CPNS service' disclosed in the present invention is a service which provide the CPNS environment. The 'CPNS service-related procedure' in the present invention is a procedure which relates to the CPNS service such as initial setting procedure for CPNS service, CPNS service request procedure, content request and provision procedure, charge-related setup procedure, etc. The present invention can make the CPNS service-related procedure simpler using the history information.

Preferred embodiments of the present invention will be described in detail with reference to the accompanying drawings.

First, FIG. 1 is a diagram showing the connective relationship between the system of the present invention and a communication network.

As shown in this drawing, a system for managing and using the history information of terminals in a CPNS environment includes a CPNS server 100 for collecting and storing the access information and history information of mobile communication terminals 200-a and 200-b (hereinafter referred to as '200') and end devices 300-a and 300-b (hereinafter referred to as '300'), which transmit and receive information over a wireless local area network, and, if the previously stored history information is requested while a CPNS is active between the mobile communication terminal 200 and the end device 300, extracting the corresponding information and providing the extracted information to the mobile communication terminal 200 and the end device 300, the mobile communication terminal 200 for, while using a CPNS, performing a procedure related to the CPNS based on the history information received from the CPNS server 100, and the end device 300 for, while using a CPNS, performing a procedure related to the CPNS based on the history information received through the mobile communication terminal 200 from the CPNS server 100.

Here, when the history information is the history information of the mobile communication terminal 200, the history information includes at least one of its own ID (i.e. of the mobile communication terminal 200), the ID of at least one connected end device 300, at least one provided service, charge information, the capability information of the end device 300, and a combination thereof, as shown in FIG. 2.

For example, as shown in FIG. 2, in the history table of the mobile communication terminal 200, when a mobile communication terminal 1 is connected to a game player 1, provided services are Games #1, #5, etc., imposed charges are $10, and the capabilities of the end device include LCD information and codec information.

In addition, the mobile communication terminal 1 is also connected to a PMP 1, and the history table further includes information, such as provided services, charge information, and the capability information of the end device.

That is, the history information of a mobile communication terminal includes information about a plurality of connected end devices, service information at the time of connection, charge information and the capability information of a corresponding end device. Thereafter, in the case where the mobile communication terminal 200 is connected again to an end device to which the mobile communication terminal 200 has been connected before, reference is made to the history information in order to make the CPNS procedure simpler.

If the history information concerning the connection between the mobile communication terminal 200 and the end device 300 has been registered, the mobile communication terminal 200 requests corresponding content based on the previously stored capability information of the end device, continues to receive a service that has been provided before or skips a charge-related setup procedure.

Furthermore, if the history information is the history information of the end device 300, the history information includes at least one of its own ID (i.e. of the end device 300), the ID of at least one connected mobile communication terminal 200, at least one provided service, charge information, service-related information and a combination thereof. The service-related information includes at least one of a rate system, a transfer rate and a combination thereof.

For example, as shown in FIG. 3, in the history table of the end device 300, when a game player 1 (end device 1) is connected to a mobile communication terminal 1, provided services are Games #2, #5, etc., imposed charges are $14, and a rate system and a transfer rate are included.

That is, the history information of an end device includes information about a plurality of connected mobile communication terminals, service information at the time of connection, charge information, and information about a rate system and a transfer rate. Thereafter, in the case where the end device 300 is connected again to the mobile communication terminal to which the end device 300 has been connected before, reference is made to the history information in order to make the CPNS procedure simpler.

If the history information concerning the connection between a mobile communication terminal and an end device has been registered, the end device 300 requests services based on previously stored information about a rate system and a transfer rate, continues to receive a service that has been provided before, skips a charge-related setup procedure, or performs setting so that charges will be imposed on a mobile communication terminal that is selected by the end device 300 from among mobile communication terminals to which the end device 300 had been connected before.

The end device 300 disclosed in FIG. 1 refers to a portable terminal equipped with a local area communication function such as a Personal Multimedia Player (PMP), a MP3 Player, a navigation terminal, a mobile phone and a game player.

Meanwhile, the wireless local area network includes all communication networks capable of local area communication as well as a Wireless Local Area Network (WLAN), a Bluetooth network, and an UltraWideBand (UWB) network.

If the CPNS server 100 disclosed in FIG. 1 detects an end device or a mobile communication terminal which has never been connected to the CPNS server 100, or the connection between end devices and mobile communication terminals, the CPNS server 100 registers corresponding information in a history table.

The CPNS server 100, the mobile communication terminal 200 and the end device 300 disclosed in FIG. 1 undergo an initial setting procedure for a CPNS, which will be described in detail later.

Figure 4:
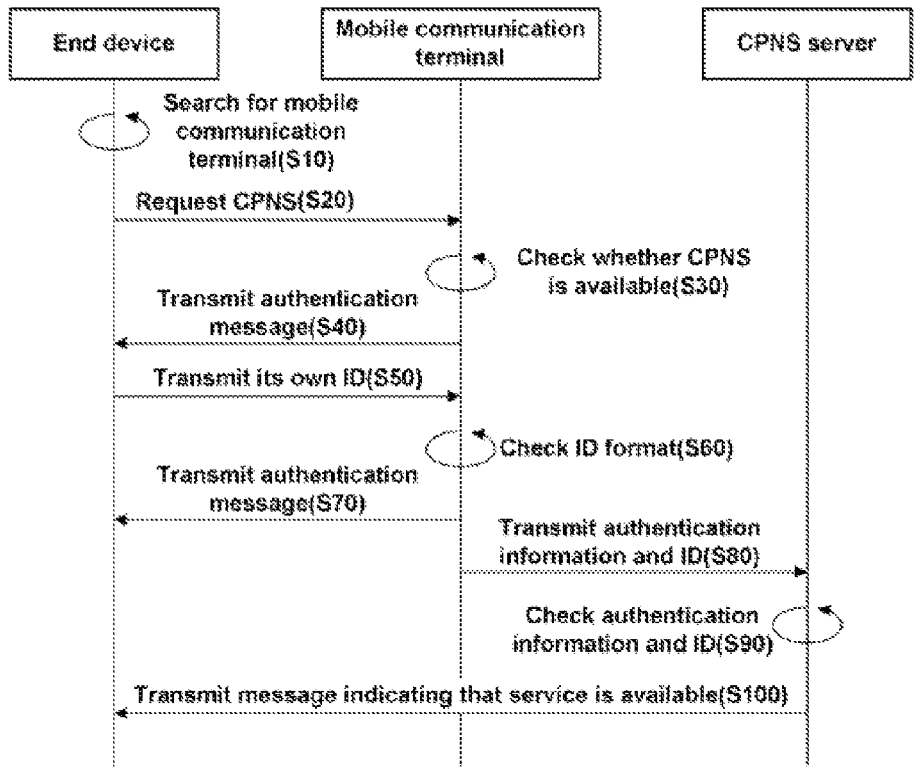
FIG. 4 is a flowchart showing an initial setting method for a CPNS according to the present invention.

FIG. 4 is a flowchart showing an initial setting method for a CPNS according to the present invention.

First, the end device 300 searches for a mobile communication terminal, which will function as a PN gateway device, in order to use a CPNS at step S10.

Next, the end device 300 requests the service from the mobile communication terminal 200 that has been found at step S10. Here, the end device also transmits CPNS-availability information to the mobile communication terminal 200 at step S20.

Thereafter, when the mobile communication terminal 200 receives a service request transmitted from the end device, the mobile communication terminal 200 checks whether the CPNS is available to the end device at step S30.

If, as a result of the checking at step S30, the CPNS is determined to be available to the end device, the mobile communication terminal 200 transmits an authentication message, indicating that the CPNS is available to the end device 300, to the end device 300 at step S40.

When the authentication message, indicating that the CPNS is possible, is received from the mobile communication terminal, the end device 300 transmits its own ID to the mobile communication terminal at step S50.

The mobile communication terminal 200 checks whether the format of the ID received from the end device 300 is consistent with an ID format issued by the CPNS server, and transmits an authentication message, indicating that the service is available to the end device 300, to the end device 300 if the formats are consistent with each other at steps S60 and 70.

Thereafter, the mobile communication terminal 200 transmits its own authentication information and ID and the authentication information and ID of the end device 300 to the CPNS server 100 at step S80.

The CPNS server 100 determines whether the CPNS is available to both the mobile communication terminal and the end device by checking the authentication information and IDs received from the mobile communication terminal at step S90.

If, as a result of the determination, the service is available to both the mobile communication terminal and the end device, the CPNS server 100 informs the end device that the service is available to the end device so that the end device can perform a CPNS procedure, including a subsequent content request, at step S100.

However, if, as a result of the determination, the service is determined not to be available to any one of the mobile communication terminal and the end device, the CPNS server 100 informs the end device of this fact and then terminates the service procedure.

Meanwhile, if, as a result of the checking at step S30, the CPNS is not available to the end device, the mobile communication terminal 200 transmits a message, indicating that the service is not available, to the end device and then terminates the service procedure.

In contrast, if, as a result of the checking at step S60, the ID format of the end device is not consistent with that issued by the CPNS server, the mobile communication terminal 200 transmits a message, indicating that the service is not available, to the end device and then terminates the service.

Figure 5:
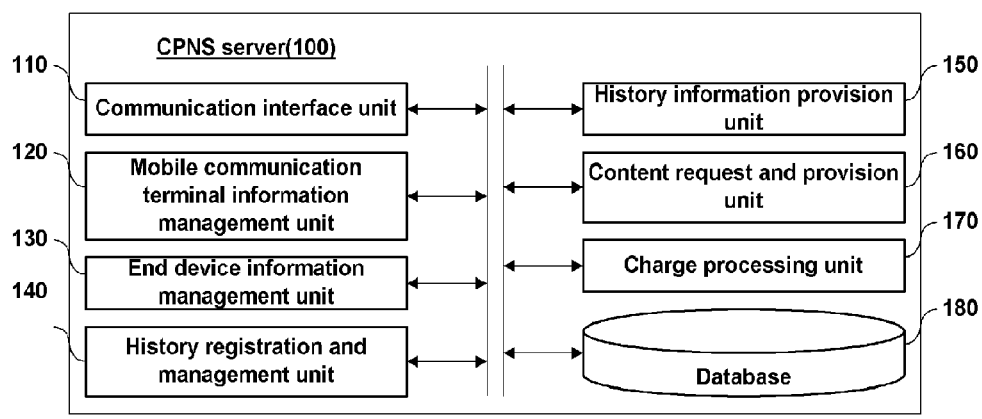
FIG. 5 is a diagram showing the construction of the CPNS server according to the present invention.

FIG. 5 is a diagram showing the construction of the CPNS server according to the present invention.

As shown in this drawing, the CPNS server 100 includes a communication interface unit 110, a mobile communication terminal information management unit 120, an end device information management unit 130, a history registration and management unit 140, a history information provision unit 150, a content request and provision unit 160, a charge processing unit 170, and a database 180.

In greater detail, the communication interface unit 110 is an element for performing communication over a mobile communication network.

The mobile communication terminal information management unit 120 registers the information of the mobile communication terminal 200, which performs communication with the end device 300 over a wireless local area network, in the database 180 and manages the registered information.

The end device information management unit 130 registers the information of the end device 300, which perform communication with the mobile communication terminal 200 over a wireless local area network, in the database 180 and manages the registered information.

The history registration and management unit 140 collects and stores the access information and history information of the mobile communication terminal 200 and the end device 300 which transmit and receive information over a wireless local area network.

Furthermore, if an end device or a mobile communication terminal, which has never been connected to the CPNS server 100, or connection between an end device and a mobile communication terminal is detected, the history registration and management unit 140 registers the corresponding information.

If previously stored history information is requested while a CPNS is provided between the mobile communication terminal 200 and the end device 300, the history information provision unit 150 extracts the corresponding information and provides the extracted information to each of the mobile communication terminal 200 and the end device 300.

Here, the history information to be provided to the end device 300 is transmitted from the CPNS server to the end device via the mobile communication terminal.

When a request for content is received from the mobile communication terminal 200, the content request and provision unit 160 requests the content from a server (not shown), which provides the corresponding content, receives the corresponding content from the server, and provides the received content to the mobile communication terminal 200.

The charge processing unit 170 imposes charges for the use of the CPNS.

Here, the function of the charge processing unit 170 may also be performed by an additional charge processing server.

The database 180 stores CPNS server-related information as well as the history information of the mobile communication terminal 200 and the end device 300.

Figure 6:
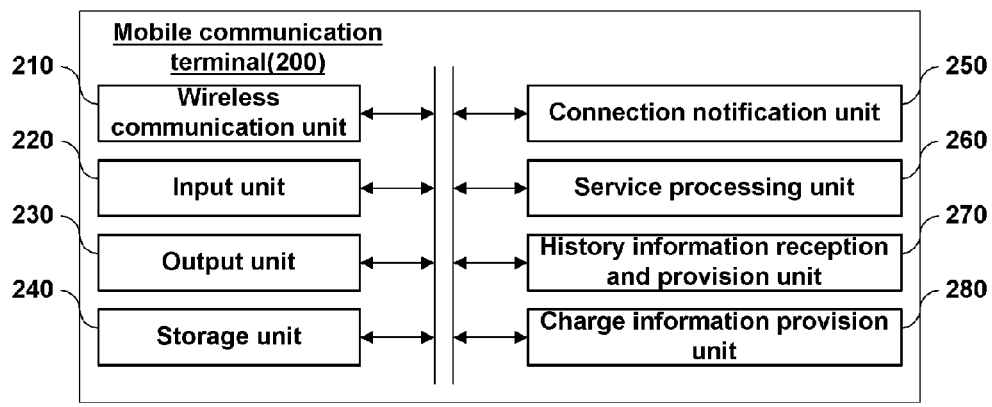
FIG. 6 is a diagram showing the construction of the mobile communication terminal according to the present invention.

FIG. 6 is a diagram showing the construction of the mobile communication terminal according to the present invention.

As shown in this drawing, the mobile communication terminal 200 includes a wireless communication unit 210, an input unit 220, an output unit 230, a storage unit 240, a connection notification unit 250, a service processing unit 260, a history information reception and provision unit 270, and a charge information provision unit 280.

The wireless communication unit 210 for performing wireless communication with the mobile communication terminal 200 over a wireless local area network or a mobile communication network, the input unit 220 for performing input control, the output unit 230 for audibly or visually providing necessary data when a voice call service or a data service is used, and the storage unit 240 for storing various pieces of data are the typical elements of a mobile communication terminal. Accordingly, detailed descriptions thereof are omitted here.

When the mobile communication terminal is connected to the end device 300 via a wireless local area network, the connection notification unit 250 provides notification of the connection to the CPNS server 100 by transmitting its own ID and authentication information and the ID and authentication information of the end device 300 to the CPNS server 100.

When the service processing unit 260 requests CPNS-related information, the service processing unit 260 requests the information from the CPNS server 100 with reference to history information received from the CPNS server 100.

The history information reception and provision unit 270 receives history information, which matches the request of the mobile communication terminal, from the CPNS server 100, and displays the received history information on a screen through the output unit 230 in order for a user to view the history information.

The charge information provision unit 280 transmits the charge-related information of the mobile communication terminal or the end device to the CPNS server 100 so that charges can be imposed for the use of a CPNS.

Figure 7:
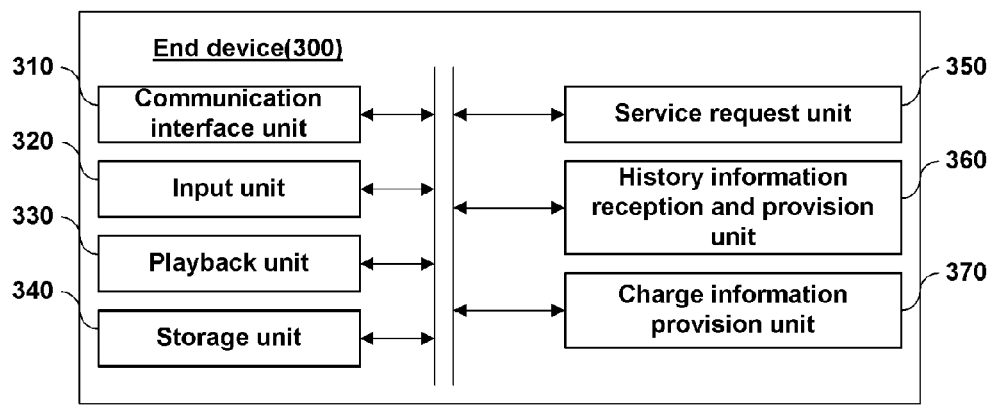
FIG. 7 is a diagram showing the construction of the end device according to the present invention.

FIG. 7 is a diagram showing the construction of the end device according to the present invention.

As shown in this drawing, the end device 300 includes a communication interface unit 310, an input unit 320, a playback unit 330, a storage unit 340, a service request unit 350, a history information reception and provision unit 360, and a charge information provision unit 370.

In greater detail, the communication interface unit 310 is a component for performing communication with a wireless local area network.

The input unit 320 receives a corresponding signal from a user according to the user's selection.

The playback unit 330 executes content received from the mobile communication terminal 200.

The storage unit 340 stores information related to the end device 300.

The service request unit 350 requests a CPNS-related service, including a specific content request, from the CPNS server 100 via the mobile communication terminal 200 based on its own history information received from the CPNS server 100.

When its own history information is received via the mobile communication terminal 200 from the CPNS server 100, the history information reception and provision unit 360 displays the history information on a screen in order for a user to view the history information.

The charge information provision unit 370 transmits information about the processing of charges based on the use of a CPNS to the mobile communication terminal 200.

Figure 8:
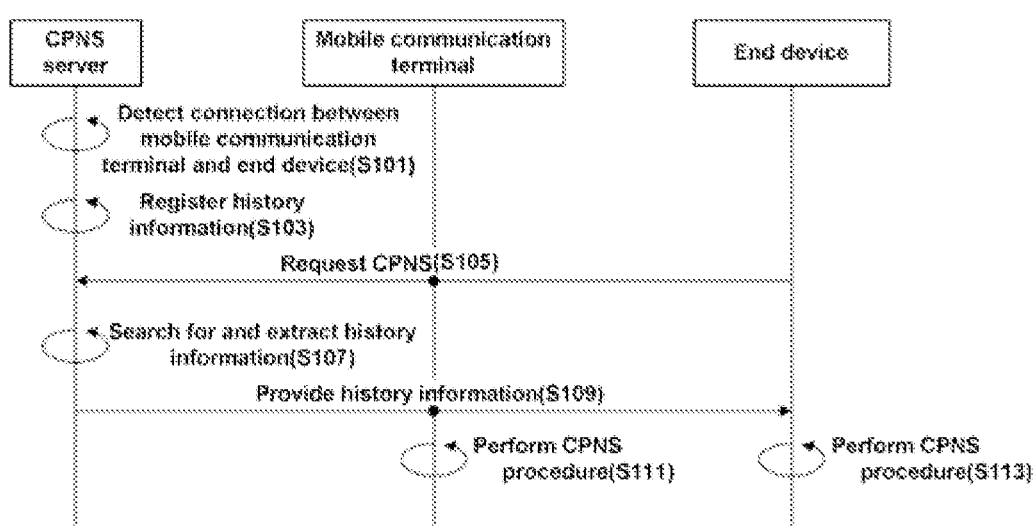
FIG. 8 is a flowchart showing a method of managing and using the history information of terminals according to the present invention.

FIG. 8 is a flowchart showing a method of managing and using the history information of terminals according to the present invention.

First, when the mobile communication terminal 200 is connected to the end device 300 over a wireless local area network, the mobile communication terminal 200 informs the CPNS server 100 of this fact.

When the mobile communication terminal is connected to the end device, the CPNS server 100 collects and stores the access information and history information of the mobile communication terminal 200 and the end device 300 which transmit and receive information over a wireless local area network at steps S101 and S103.

Thereafter, when a specific request received from the mobile communication terminal is associated with history information, the CPNS server 100 extracts the history information of the mobile communication terminal and the end device, and provides the extracted history information to the mobile communication terminal and the end device at steps S105 to S109.

That is, at step S109, the mobile communication terminal 200 receives history information, which is associated with a specific service, from the CPNS server 100 by requesting the specific service from the CPNS server 100.

Here, in the case where the specific service has been requested by the end device, if the end device requests the specific service from the mobile communication terminal via wireless local area communication, the mobile communication terminal transfers the specific service to the CPNS server.

Thereafter, while using the CPNS, the mobile communication terminal 200 and the end device 300 perform CPNS-related procedures based on the history information received from the CPNS server 100 at steps S111 and S113.

Here, when the history information is the history information of a mobile communication terminal, the history information includes at least one of its own ID (for example, a Mobile Identification Number (MIN), a Mobile Directory Number (MDN), an International Mobile Equipment Identity (IMEI) number, or a subscription number managed by a mobile communication service provider) (i.e. of the mobile communication terminal), the ID of at least one connected end device, and at least one provided service, charge information, the capability information of the end device, and a combination thereof. At step S111, the mobile communication terminal 200 requests corresponding content based on the previously stored capability information of the end device, continues to receive a service that has been provided before, or skips a charge-related setup procedure.

When the history information is the history information of an end device, the history information includes at least one of its own ID, the ID of at least one connected mobile communication terminal, at least one provided service, charge information, service-related information, and a combination thereof. The service-related information includes at least one of a rate system, a transfer rate, and a combination thereof. At step S113, the end device 300 requests the service based on the previously stored information of a rate system and a transfer rate, continues to receive services that have been provided before, skips a charge-related setup procedure, or performs setting so that the charges are imposed on the mobile communication terminal which is selected by the end device 300 from among mobile communication terminals to which the end device 300 had been connected before.

As described above, it will be appreciated by those skilled in the art that the present invention can be implemented in other specific forms without changing the technical spirit or indispensable characteristics of the present invention. Accordingly, it should be understood that the above-described embodiments are illustrative and not limitative under any interpretation. The scope of the present invention is defined by the appended claims rather than the detailed description. Furthermore, it should be appreciated that all modifications or variations derived from the meaning and range of the appended claims and their equivalents pertain to the scope of the present invention.

INDUSTRIAL APPLICABILITY

As described above, the system and method for managing and using the history information of terminals in a CPNS environment, and the CPNS server, the mobile communication terminal and the end device therefor according to the present invention are suitable for cases requiring the performance of simpler procedures in order to receive a CPNS, because access information and related information, which are generated when the mobile communication terminal and the end device are connected over a wireless local area network and are provided with a CPNS in the CPNS environment, are managed systematically and are then provided to the mobile communication terminal and the end device.

The invention claimed is:

1. A system for managing and using history information of terminals in a Converged Personal Network Service (CPNS) environment, the system comprising:
 a CPNS server for collecting and storing access information and history information of mobile communication terminals and end devices which transmit and receive information between the mobile communication terminals and the end devices over a wireless local area network, and, when previously stored history information is requested while a CPNS is active between a mobile communication terminal and an end device, extracting the requested history information, and providing the extracted history information to the mobile communication terminal and then to the end device via the mobile communication terminal;

the mobile communication terminals each for, while using the CPNS, performing a CPNS-related procedure, by using the extracted history information received from the CPNS server; and the end devices each for, while using the CPNS, performing the CPNS-related procedure, by using the extracted history information received from the CPNS server via the mobile communication terminal.

2. The system according to claim 1, wherein:

the history information of each of the mobile communication terminals includes at least one of an ID of the mobile communication terminal, an ID of at least one connected end device, at least one provided service, charge information, capability information of the end device and a combination thereof, and the ID of each of the mobile communication terminals includes any one of a Mobile Identification Number (MIN), a Mobile Directory Number (MDN), an International Mobile Equipment Identity (IMEI) number, a subscription number, and a combination thereof.

3. The system according to claim 2, wherein, when the history information concerning the connection between the mobile communication terminal and the end device has been registered, the mobile communication terminal requests content using previously stored capability information of the end device, continues to receive a service that has been provided to the end device before, or skips a charge-related setup procedure.

4. The system according to claim 1, wherein:

if the history information is history information of the end device, the history information includes at least one of an ID of the end device, an ID of at least one connected mobile communication terminal, at least one provided service, charge information, service-related information and a combination thereof, and the service-related information includes at least one of a rate system, a transfer rate and a combination thereof.

5. The system according to claim 4, wherein, if the history information concerning connection between the mobile communication terminal and the end device has been registered, the end device requests a service based on the previously stored rate system and transfer rate, continues to receive a service that has been provided before, skips a charge-related setup procedure, or performs setting so that charges are imposed on the mobile communication terminal that is selected by the end device from mobile communication terminals to which the end device had been connected before.

6. A Converged Personal Network Service (CPNS) server, comprising:

a communication interface unit for performing communication over a mobile communication network;

a history registration and management unit for collecting and storing access information and history information of mobile communication terminals and end devices which transmit and receive information between the mobile communication terminals and the end devices over a wireless local area network;

a history information provision unit for, when previously stored history information is requested while a CPNS is provided between a mobile communication terminal and then an end device via the mobile communication terminal, extracting the requested history information and providing the extracted history information to the mobile communication terminal and then to the end device via the mobile communication terminal;

a content request and provision unit for, when a request for content is received from the mobile communication terminal, requesting the content from a corresponding server that provides the content, receiving the requested content from the corresponding server, and providing the received content to the mobile communication terminal;

a charge processing unit for imposing charges for use of the CPNS; and a database for storing the history information of the mobile communication terminals and end devices and information related to the CPNS server.

7. The CPNS server according to claim 6, further comprising a mobile communication terminal information management unit for registering in the database the history information of the mobile communication terminals which perform communication with end devices over a wireless local area network and managing the information.

8. The CPNS server according to claim 7, further comprising an end device information management unit for registering in the database the history information of the end devices which perform communication with the mobile communication terminals over a wireless local area network and managing the history information of the end devices.

9. The CPNS server according to claim 6, further comprising an end device information management unit for registering in the database information of the end devices which perform communication with the mobile communication terminals over a wireless local area network and managing the information of the end devices.

10. A mobile communication terminal connected to a Converged Personal Network Service (CPNS) server via a mobile communication network, connected to at least one end device via wireless local area communication, and configured to refer to history information of mobile communication terminals and end devices which transmit and receive information between the mobile communication terminals and the end devices over a wireless local area network when using a CPNS, the mobile communication terminal comprising:

a wireless communication unit for performing wireless communication with a wireless local area network or the mobile communication network;

a connection notification unit for transmitting IDs and authentication information of the end device and the mobile communication terminal to the CPNS server;

a service processing unit for requesting information related to the CPNS from the CPNS server with reference to the history information received from the CPNS server;

a history information reception and provision unit for receiving the history information, which matches a request of the mobile communication terminal, from the CPNS server, providing the history information received from the CPNS server to the end device, and displaying the received history information on a screen; and a charge information provision unit for transmitting charge information of the mobile communication terminal or the end device to the CPNS server.

11. An end device connected to at least one mobile communication terminal over a wireless local area network and configured to receive a Converged Personal Network Service (CPNS) with reference to history information of mobile communication terminals and end devices which transmit and receive information between the mobile communication terminals and the end devices over a wireless local area network, the end device comprising:
- a communication interface unit for performing communication over the wireless local area network;
- a service request unit for requesting a CPNS from a CPNS server through the mobile communication terminal using the history information of the end device, received from the CPNS server;
- a history information reception and provision unit for, when the history information of the end device is received through the mobile communication terminal from the CPNS server, displaying the received history information of the end device, on a screen; and
- a charge information provision unit for transmitting charge information based on use of the CPNS to the mobile communication terminal.

12. A method of managing and using history information of terminals in a Converged Personal Network Service (CPNS) environment for a system including a CPNS server, at least one mobile communication terminal and at least one end device, the method comprising the steps of:
- a) when the mobile communication terminal and the end device are connected, the CPNS server collecting and storing access information and history information of the mobile communication terminal and the end device which transmit and receive information between the mobile communication terminals and the end devices over a wireless local area network;
- b) when a request received from the mobile communication terminal is related to history information, the CPNS server extracting history information of the mobile communication terminal and the end device and providing the extracted history information to the mobile communication terminal and then to the end device via the mobile communication terminal;
- c) while using a CPNS, the mobile communication terminal performing a CPNS-related procedure, by using the history information received from the CPNS server; and
- d) while using the CPNS, the end device performing the CPNS-related procedure, by using the history information received from the CPNS server via the mobile communication terminal.

13. The method according to claim 12, wherein:
when the history information is history information of the mobile communication terminal, the history information includes at least one of an ID of the mobile communication terminal, an ID of the connected end device, at least one provided service, charge information, capability information of the end device and a combination thereof, and
at step c), the mobile communication terminal requests corresponding content based on the previously stored capability information of the end device, continues to receive a service that has been provided before or skips a charge-related setup procedure.

14. The method according to claim 12, wherein:
when the history information is history information of the end device, the history information includes at least one of an ID of the end device, an ID of the connected mobile communication terminal, at least one provided service, charge information, service-related information and a combination thereof, the service-related information including at least one of a rate system, a transfer rate and a combination thereof, and
at step d), the end device requests a service based on the previously stored rate system and transfer rate, continues to receive a service that has been provided before, skips a charge-related setup procedure, or performs setting so that charges are imposed on the mobile communication terminal which is selected by the end device from among mobile communication terminals to which the end device had been connected before.

15. A method of managing and using history information of terminals in a Converged Personal Network Service (CPNS) environment for a CPNS server, the method comprising the steps of:
- a) when a mobile communication terminal and an end device are connected, the CPNS server collecting and storing access information and history information of the mobile communication terminal and the end device which transmit and receive information over a wireless local area network;
- b) when a specific request generated and received from a mobile communication terminal is related to history information, the CPNS server extracting the history information of the mobile communication terminal and the end device and providing the extracted history information to the mobile communication terminal and then to the end device via the mobile communication terminal;
- c) when a request for content is received from the mobile communication terminal, the CPNS server requesting the content from a corresponding server that provides the content, receiving the requested content from the corresponding server, and providing the received content to the mobile communication terminal;
- d) imposing charges for use of the CPNS; and
- e) storing the history information of the mobile communication terminals and end devices and information related to the CPNS server.

16. A method of using history information of terminals in a Converged Personal Network Service (CPNS) environment for a mobile communication terminal connected to a CPNS server via a mobile communication network and connected to an end device via a wireless local area network, the method comprising the steps of:
- a) when the mobile communication terminal is connected to the end device over the wireless local area network, the mobile communication terminal informing the CPNS server of this connection and transmitting IDs and authentication information of the end device and the mobile communication terminal to the CPNS server;
- b) when a specific service is requested of the CPNS server, the mobile communication terminal receiving specific service-related history information from the CPNS server;
- c) while using a CPNS, the mobile communication terminal performing a CPNS-related procedure, by using the history information received from the CPNS server;
- d) the mobile communication terminal displaying the received history information on a screen of the mobile communication terminal; and
- e) the mobile communication terminal transmitting charge information of the mobile communication terminal or the end device to the CPNS server.

17. A method of using history information of terminals in a Converged Personal Network Service (CPNS) environment for an end device connected to a mobile communication terminal via a wireless local area network, the method comprising the steps of:
- a) the end device requesting a specific service from a CPNS server through the mobile communication terminal via wireless local area communication;

b) the end device receiving specific service-related history information from the CPNS server through the mobile communication terminal;
c) while using a CPNS, the end device performing a CPNS-related procedure, by using the history information received from the CPNS server via the mobile communication terminal;
d) the end device displaying the received history information of the end device, on a screen of the end device; and
e) the end device transmitting charge information based on use of the CPNS to the mobile communication terminal.

\* \* \* \* \*